United States Patent
Wang

(10) Patent No.: US 7,287,245 B2
(45) Date of Patent: Oct. 23, 2007

(54) METHOD FOR REAL-TIME INSTRUCTION INFORMATION TRACING

(75) Inventor: Yu-Min Wang, Tai-Chung (TW)

(73) Assignee: Faraday Technology Corp., Hsin-Chu (TW)

( * ) Notice: Subject to any disclaimer, the term of this patent is extended or adjusted under 35 U.S.C. 154(b) by 762 days.

(21) Appl. No.: 10/605,231

(22) Filed: Sep. 17, 2003

(65) Prior Publication Data

US 2005/0060521 A1 Mar. 17, 2005

(51) Int. Cl.
*G06F 9/44* (2006.01)
(52) U.S. Cl. .................................... 717/128
(58) Field of Classification Search ........ 717/124–129, 717/128–130; 714/38, 45; 712/227
See application file for complete search history.

(56) References Cited

U.S. PATENT DOCUMENTS

| | | | | |
|---|---|---|---|---|
| 5,724,505 | A * | 3/1998 | Argade et al. ................ | 714/45 |
| 5,751,942 | A * | 5/1998 | Christensen et al. .......... | 714/38 |
| 6,145,123 | A * | 11/2000 | Torrey et al. ............... | 717/128 |
| 6,223,338 | B1 * | 4/2001 | Smolders .................... | 717/128 |
| 6,351,844 | B1 * | 2/2002 | Bala .......................... | 717/128 |
| 6,826,747 | B1 * | 11/2004 | Augsburg et al. ............ | 717/128 |
| 7,062,684 | B2 * | 6/2006 | DeWitt et al. ............... | 714/45 |
| 2003/0051231 | A1 * | 3/2003 | Schwemmlein et al. .... | 717/128 |
| 2004/0030962 | A1 * | 2/2004 | Swaine et al. ............... | 714/45 |
| 2004/0123084 | A1 * | 6/2004 | DeWitt et al. .............. | 712/227 |

FOREIGN PATENT DOCUMENTS

TW 527567 4/2003

OTHER PUBLICATIONS

Charton D. Rose, et al. "Constructing instruction traces from cache-filtered address traces (CITCAT)", Dec. 1996, ACM Press, vol. 24, Issue 5, pp. 1-8.*
Charles R. Hill, "A real-time microprocessor debugging technique", 1983, ACM Press, Session: Implementation issues, pp. 145-148.*

* cited by examiner

*Primary Examiner*—Wei Zhen
*Assistant Examiner*—Anna Deng
(74) *Attorney, Agent, or Firm*—Winston Hsu

(57) ABSTRACT

A method for real-time instruction information tracing for recording the information about a plurality of specific instructions executed by a processor. The method contains the following steps. A trace count value is set to an initial value. A trigger count value is set according to the tracing start point. The trace count value is increased whenever a specific instruction executed by the processor. If the increased trace count value is equal to or larger than the trigger count value, record the instruction information about the specific instruction executed by the processor in a buffer; if the buffer is full, stop running the program and output the instruction information stored in the buffer. During this time reset the trigger count value according to the trace count value, reset the trace count value as the initial value, and then start running the program with the processor again.

9 Claims, 2 Drawing Sheets

METHOD FOR REAL-TIME INSTRUCTION INFORMATION TRACING

BACKGROUND OF INVENTION

1. Field of the Invention

The invention relates to real-time instruction information tracing, and more particularly, to a method for recording instruction information of specific instructions executed by a microprocessor while the microprocessor runs a program.

2. Description of the Prior Art

In order to debug a program while a microprocessor runs the program, an instruction tracing technique is commonly used. The instruction tracing technique is used for tracing and recording instruction information of some specific instructions executed by the microprocessor while the microprocessor runs the program. The instruction information can be of various forms, such as a memory address storing the specific instruction or a controlling code of the specific instruction. What kind of instruction information that needs to be recorded depends on debugging demands.

Some bugs only occur when the microprocessor executes the whole program but does not occur if the running operation is interrupted. In other words, the bugs happen only when there are no interruptions caused by tracing operations when the microprocessor runs the whole program. In order to find this kind of bug, an instruction tracing method that can trace and record the specific instruction executed by the microprocessor without interrupting the running process of the microprocessor is often used.

Please refer to FIG. 1. FIG. 1 is a simple block diagram of the prior art and comprises a microprocessor 120 for running a program, a filter 130 electrically connected to the microprocessor 120 for filtering instruction information about the specific instructions from those instructions executed by the microprocessor 120, the filter 130 can be either hardware or software; a buffer 140 electrically connected to the filter 130 for recording the instruction information of the specific instructions executed by the microprocessor 120; an output interface 150 electrically connected to the buffer 140 for outputting the instruction information stored in the buffer 40; and a storage device 160 electrically connected to the output interface 150 for receiving the instruction information outputted from the output interface 150.

The prior art of FIG. 1 operates as follows. As the microprocessor 120 runs a program, a buffer 140 synchronously records instruction information about the specific instructions executed by the microprocessor 120. However, the capacity of the buffer 140 is often not capable recording the instruction information about every instruction in the entire program. Therefore, an output interface 150 is employed to transmit information already stored in the buffer 140 to the storage device 160. With the information transmitted, the buffer 140 has space to record new instruction information, meaning that the real-time instruction tracing is maintained.

One caveat remains though. The capacity of the buffer 140 and the transmitting speed of the output interface 150 need to be carefully matched to each other and the microprocessor 120. In other words, the capacity of the buffer 140 and the transmitting speed of the output interface 150 must both be large enough so that the buffer never becomes full. Otherwise, not all the information regarding the specific instructions executed by the microprocessor 120 will be recorded by the tracing operation for use in debugging. Combining this requirement with the extremely fast operational speed of the microprocessor 120 necessitates the need for both the buffer 140 of corresponding capacity and the output interface 150 of corresponding transmitting speed. Meaning, the primary drawback of the prior art is that the buffer and output interface that fit the above conditions will result in increased hardware cost.

SUMMARY OF INVENTION

It is therefore a primary objective of the claimed invention to provide a method for real-time instruction tracing with a lower hardware cost to solve the above-mentioned problem.

According to the claimed invention, a method for real-time instruction information tracing records information about a plurality of specific instructions executed by a microprocessor from a tracing start point in the history of running a program, wherein the program contains the specific instructions. The method comprises the following. The method sets a trace count value to an initial value and sets a trigger count value to the value where tracing is to be started according to the tracing start point. After each time the microprocessor executes a specific instruction, the method will increase the trace count value by one and then compare the increased trace count value to the trigger count value. If the increased trace count value is equal to or larger than the trigger count value, the method will record instruction information about the specific instruction executed by the microprocessor into a buffer. When the buffer becomes full, the method stops the running of the program and outputs the instruction information stored in the buffer via an output interface. The trigger count value is then reset according to the trace count value present when the buffer was full. Afterwards, the trace count value is reset to the initial value, and the microprocessor reruns the program. If the microprocessor finishes running the program, the method will output all the instruction information stored in the buffer via the output interface.

In the present invention, the trace count value represents the position of the most recent specific instruction executed so far by the microprocessor while the trigger count value represents the position of the specific instruction at which the buffer needs to begin recording information. By comparing the trace count value and the trigger count value, the tracing flow of the method can be controlled.

Since the buffer synchronously records the instruction information allowing the microprocessor to run the program without any interruption, "real-time" tracing is accomplished. Each time the buffer is full, the microprocessor stops the running of the program and outputs the instruction information stored in the buffer. Afterwards, the program is rerun. As a result, both the capacity of the buffer and bandwidth of the output interface are not as demanding as that in the prior art thereby lowering the hardware cost.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
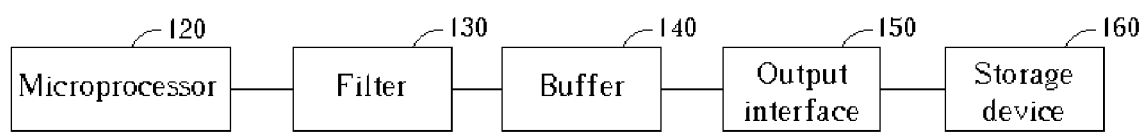
FIG. 1 is a simple diagram of the prior art.
Figure 2:
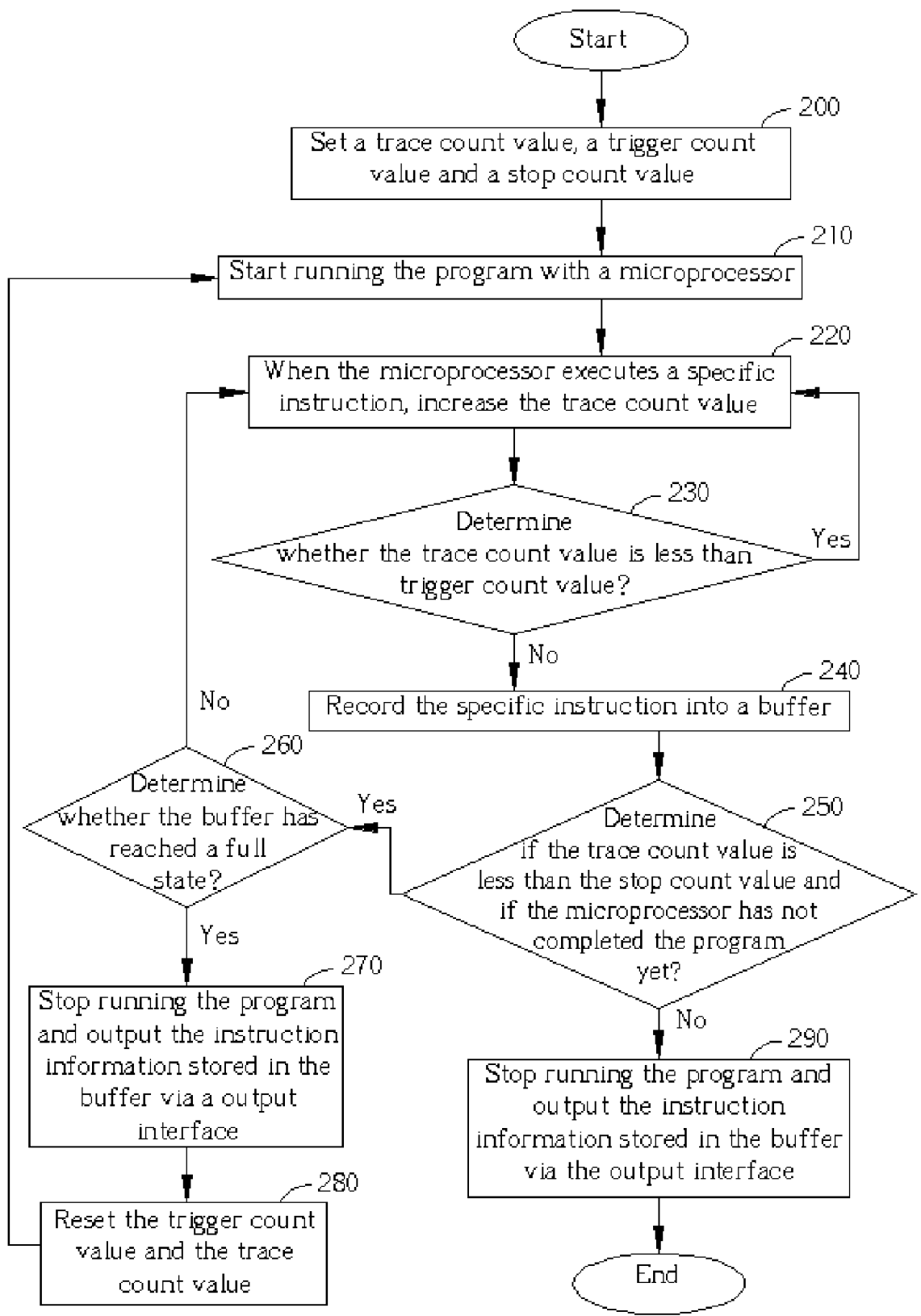
FIG. 2 is a flowchart of real-time instruction tracing according to the present invention.

Please refer to FIG. 2. FIG. 2 is a flowchart of the real-time instruction tracing according to the present invention. The flow shown in FIG. 2 is used for recording the information about a plurality of specific instructions within a program executed by a microprocessor from a tracing start point in the running history. The steps of FIG. 2 will be described in detail as follows:

Step 200: Set the trace count value to an initial value; set the trigger count value according to the desired start point of tracing; set the stop count value according to the desired stop point of tracing.

Step 210: Start running the program from the beginning with the microprocessor.

Step 220: Increase the trace count value when an instruction is executed by the microprocessor.

Step 230: If the trace count value is less than the trigger count value, go back to the step 220. Otherwise, go to the step 240.

Step 240: Record the instruction information about the specific instruction just executed by the microprocessor into a buffer.

Step 250: If the trace count value is less than the stop count value and the microprocessor has not finished running the program yet, go to the step 260. Otherwise, go to the step 290.

Step 260: If the buffer is not full, go back to the step 220. Otherwise, go to the step 270.

Step 270: Stop the microprocessor from continuing to run the program and output the instruction information recorded in the buffer via an output interface.

Step 280: Reset the trigger count value according to the trace count value present when the buffer was full and then reset the trace count value to the initial value before going back to the step 210.

Step 290: Stop the microprocessor from continuing to run the program and output the instruction information recorded in the buffer via an output interface.

The following example elaborates the above steps of the present invention in detail. For ease in explanation, let us assume the microprocessor executes 1000 specific instructions while running a program, and the buffer has the capacity to store information about 200 specific instructions. Let us also assume that the initial value is zero. We want information about the program starting from the $101^{st}$ specific instruction to the $700^{th}$ specific instruction (the $101^{st}$ specific instruction being the desired start tracing point and the $700^{th}$ specific instruction being the desired stop tracing point).

Please notice that the initial value is not necessarily limited to zero; it can be set to any other integer. In addition, the increments used to increase the trace count value each time is similarly not necessarily limited to 1; increments of 2, 3, or any other integer can be used to increase the trace count value. For example, the initial value can be set to 50 and the trace count value can be increased in increments of 20. Furthermore, the process of increasing the trace count value in the step 220 can change over to a decreasing process by modifying the steps 230 and 250. The main point is to determine whether or not the buffer should record the instruction information by comparing the trace count value with the trigger count value. The ways of changing the trace count value and setting the initial value are depend on the system designer.

The step 200 sets the trace count value to zero, the trigger count value to 101, and the stop count value to 700. The step 210 then starts to run the program. When the microprocessor executes the first specific instruction, step 220 increases the trace count value from zero to one. The step 230 then compares the trace count value to the trigger count value and then chooses the appropriate step. Since the trace count value is less than the trigger count value in this case, the buffer does not record anything, and we go back to the step 220. Because the trace count value will continue to be less than the trigger count value until the microprocessor executes the $101^{st}$ specific instruction, steps 220, 230 will loop repeatedly and increase the trace count value in increment of 1 each time.

After the two steps are executed 101 rounds, the trace count value becomes 101 and equals the trigger count value, so go to the step 240 instead of looping back to the step 220. The buffer records the instruction information of the $101^{st}$ specific instruction and goes to the step 250 where the trace count value (101) is compared to the stop count value (700). Since the trace count value is less than the stop count value, and the microprocessor has not finished completing the program, go to the step 260 where the state of the buffer is checked. The buffer now has only record one instruction information and therefore has not reached its full state (the buffer can store 200 instruction information). As a result, the steps 220-260 will be repeatedly executed in sequence. Executing these five steps per round, the trace count value increases by one and the buffer records one additional instruction information about the specific instruction.

Obviously, the buffer reaches a full state (wherein the buffer records the instruction information of the $101^{st}$ to the $300^{th}$ specific instruction) after 200 rounds of the five steps have been executed, that is the trace count value increases to 300 from 101, and go to the step 270. The step 270 stops the microprocessor from continuing to run the program and outputs the information about the 200 specific instructions stored in the buffer via the output interface. The output interface can be electrically connected to a storage device where all the instruction information that needs to be recorded can be recorded. Since the instruction information of the $101^{st}$ to the $300^{th}$ specific instructions has now been obtained, the trigger count value will be reset to 301 (that is the trace count value 300 when the buffer full and plus 1) in the step 280. That indicates the instruction information from the $301^{st}$ specific instruction needs to be recorded next time and the trace count value is reset to zero.

Next go back to the step 210 to start running the program from the beginning again. In the step 220, the computer executes a specific instruction, causing the trace count value to increase by 1. Because the trigger count value now equals to 301, the steps 220, 230 will be repeatedly executed in sequence for 301 rounds, after which the trace count value becomes 301. At this time the trace count value equals the trigger count value; therefore go to the step 240 where the buffer records the instruction information of the $301^{st}$ specific instruction. As mentioned above, the buffer can store information about 200 specific instructions; therefore the five steps 220, 230, 240, 250, and 260 are executed in sequence for 200 rounds, and the trace count value increases to 500 from 301.

The buffer now stores information about another 200 specific instructions (the instruction information of the $301^{st}$ to the $500^{th}$ specific instruction) and is at a full state, so go to the step 270 to stop the microprocessor from continuing to run the program. And outputting information about the 200 specific instructions stored in the buffer via the output interface and go to the step 280. Since the instruction information of the $101^{st}$ to the $500^{th}$ specific instruction has now been obtained, the trigger count value is reset to 501 (that is the trace count value 500 when the buffer full and plus 1), and the trace count value is reset to zero.

Return to the step 210 where the program starts to run from the beginning again, and the steps 220, 230 are executed for 501 rounds until the trace count value equals to the trigger count value, 501. The buffer then starts to record instruction information from the $501^{st}$ specific instruction. After the steps 220, 230, 240, 250, and 260 are executed in sequence for 199 rounds, the trace count value is increased to 699. After executing the steps 220, 230, and 240 in sequence for one more round, the trace count value increases to 700, and 200 specific instruction information (that is from the $501^{st}$ to the $700^{th}$ specific instruction) is recorded in the buffer at this time. Go to the step 250, because the trace count value now equals the stop count value, go to the step 260. In the step 260, the microprocessor stops running the program, outputs the information about the 200 specific instructions stored in the buffer via the output interface, and then ends the whole tracing operation. Please notice that the instruction information about the $101^{st}$ to the $700^{th}$ specific instruction is obtained through the output interface.

Please notice that if the program has higher reconstruction ability, debugging with the instruction information recorded by the tracing method according to the present invention has more reference value.

Additionally, neither a tracing stop point nor a stop count value is necessarily required. A system designer can decide wherever to start recording instruction information, and the whole recording process will automatically end after the microprocessor completely executes the program. If in the above-mentioned example, the trigger count value were still set to 101 but there were no tracing stop point and the stop count value, the tracing process would record instruction information from the $101^{st}$ specific instruction to the last specific instruction (that is the $1000^{th}$ specific instruction), and the tracing process would automatically end after the microprocessor completed the program. The instruction information about the $101^{st}$ to the $1000^{th}$ specific instruction can be obtained through the output interface of the tracing process. The tracing process can also be designed to terminate by a call from the user.

Additionally, in the implementation of the instruction tracing technique according to the present invention, the step 200 further comprises providing a trace count register for storing the trace count value and a trigger count register for storing the trigger count value. The step 220 further comprises providing a filter in hardware or software form for filtering instruction information from the specific instructions executed by the microprocessor and storing the instruction information in the buffer. The step 230 further comprises providing a comparator for comparing the trace count value with the trigger count value. The step 270 and the step 290 further respectively comprise providing a storage device for storing the instruction information outputted from the output interface. Additionally, if a tracing stop point and a stop count value are considered, the step 200 further comprises providing a stop-count register for storing the stop count value, and the step 250 further comprises providing a comparator for comparing the stop count value with the trigger count value to determine whether the tracing-stop point had been reached. Of course, the step 250 could also use a comparator for comparing the trace count value with the trigger count value or comparing the trace count value with the stop count value.

Compared with the prior art, the tracing method of the present invention uses a trace count value to represent the position of the specific instruction just executed by the microprocessor in its whole running history and uses a trigger count value for representing the position of the specific instruction at which the buffer should start recording instruction information. By comparing the trace count value with the trigger count value, the tracing flow can be controlled.

Even though the buffer stops recording each time it is full to output stored information, the requirement of "real-time" tracing is still fulfilled because the stored information was recorded while the microprocessor runs without interruption. In addition, each time when the buffer becomes full, the microprocessor stops running the program, and the instruction information stored in the buffer are outputted, and then reruns the program again. Therefore, both the capacity of the buffer and bandwidth of the output interface are not as demanding as that in the prior art, and the hardware cost thereby reduced.

Those skilled in the art will readily observe that numerous modifications and alterations of the device may be made while retaining the teachings of the invention. Accordingly, that above disclosure should be construed as limited only by the metes and bounds of the appended claims.

The invention claimed is:

1. A method for real-time instruction information tracing, when a microprocessor runs a program comprising a plurality of specific instructions, the method records instruction information of the specific instructions executed by the microprocessor from a tracing start point, the method comprising:

setting a trace count value as an initial value;

setting a trigger count value according to the tracing start point;

starting to run the program with the microprocessor;

when a specific instruction is executed by the microprocessor, increasing the trace count value;

if the increased trace count value is equal to or larger than the trigger count value, recording the instruction information of the specific instruction executed by the microprocessor in a buffer;

when the buffer is full, stopping running the program with the microprocessor and outputting instruction information recorded in the buffer via an output interface;

resetting the trigger count value according to the trace count value while the buffer is full, resetting the tracing value with the initial value, using the microprocessor to start to run the program; and when the microprocessor finishes running the program, outputting instruction information recorded in the buffer via the output interface.

2. The method of claim 1, wherein the method further comprises:

setting a stop count value according to a tracing stop point; and when the trace count value is equal to or larger than the stop count value, stopping running the program with the microprocessor and outputting instruction information recorded in the buffer via the output interface.

3. The method of claim 2, wherein the method further comprises providing a stop count register for storing the stop count value.

4. The method of claim 2, wherein the method further comprises providing a comparator for comparing the trace count value with the stop count value.

5. The method of claim 1, wherein the method further comprises providing a trace count register for storing the trace count value.

6. The method of claim 1, wherein the method further comprises providing a trigger count register for storing the trigger count value.

7. The method of claim 1, wherein the method further comprises providing a comparator for comparing the trace count value with the trigger count value.

8. The method of claim 1, wherein the method further comprises providing a filter for filtering instruction information of the specific instructions executed by the microprocessor when the microprocessor is running the program.

9. The method of claim 1, wherein the method further comprises providing a storage device electrically connected to the output interface for reading out and recording instruction information recorded in the buffer.

* * * * *